United States Patent Office 3,561,981
Patented Feb. 9, 1971

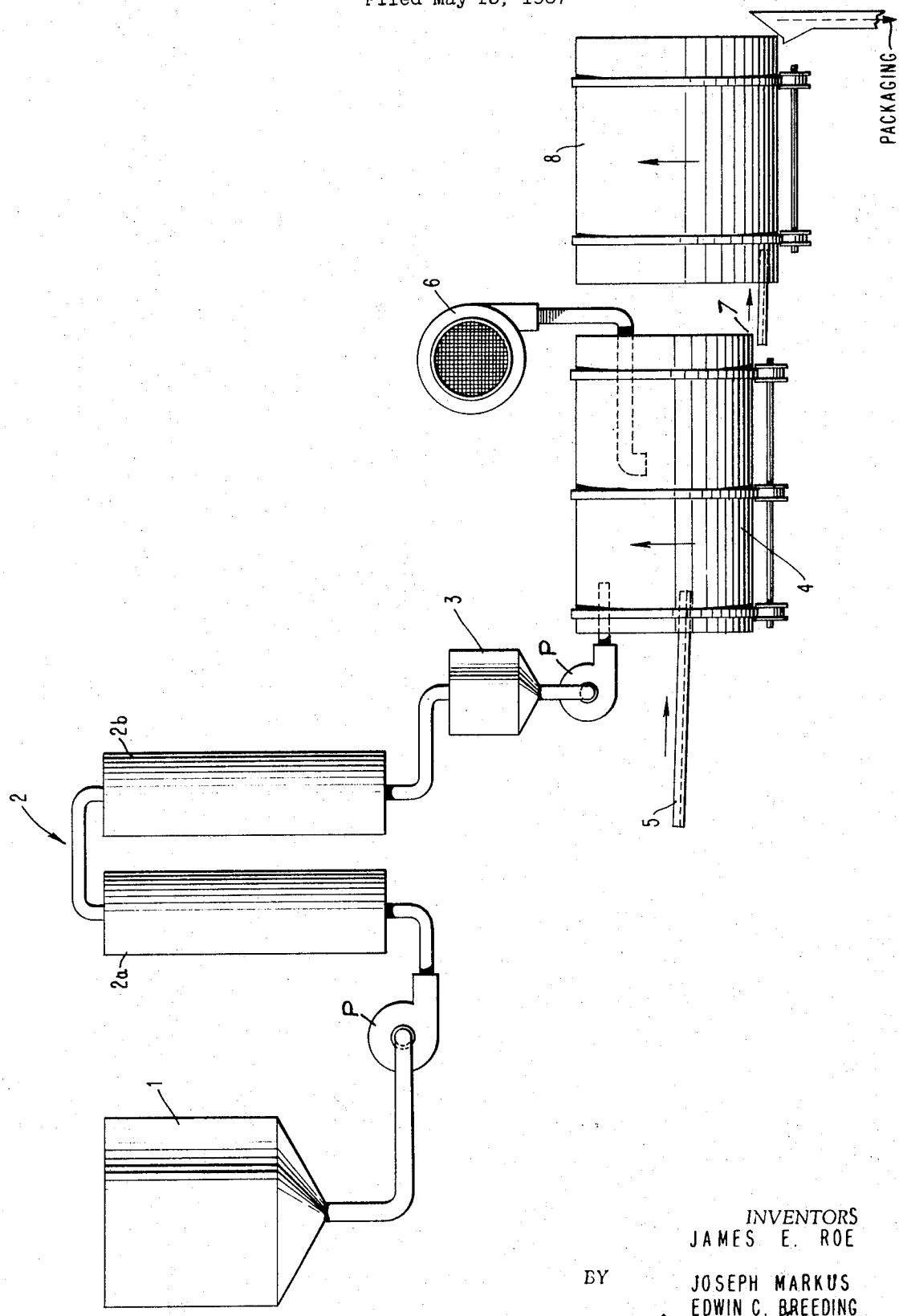

3,561,981
METHOD FOR COATING CEREAL WITH ICE CREAM PRODUCTS
James E. Roe, Wayne, N.J., Joseph Markus, Hicksville, N.Y., and Edwin C. Breeding, Riverside, Conn., assignors to National Biscuit Company, a corporation of New Jersey
Filed May 15, 1967, Ser. No. 638,440
Int. Cl. A23l 1/10
U.S. Cl. 99—166   6 Claims

ABSTRACT OF THE DISCLOSURE

A ready-to-eat breakfast cereal is prepared which, upon addition of milk, develops the characteristic flavor of ice cream. The product is prepared by first precoating cereal particles, with a binder, which is preferably sugar syrup, and while still tacky, applying a dry flavoring composition, consisting essentially of a dry ice cream product, such as freeze-dried ice cream, spray-dried ice cream, powdered ice cream mixes and in general, any dehydrated ice cream product. The finished goods, after drying, contain 15-66% cereal material, 1-50% sugar, and 5-35% flavoring composition.

---

This invention relates to the production of coated food products, and, more specifically, to breakfast cereals characterized by a coating of an improved and novel flavoring composition. The invention also relates to the novel process of manufacture used in the preparation of the novel food articles, as described herein.

It will be understood that the term "food products" as used in this application, is not intended to be limited to breakfast cereals, but is applicable to other edible products, such as confections of many different types, baked goods, for instance doughnuts, and other products, such as nuts, popcorn, chips or snacks. The invention is particularly applicable to processed ready-to-eat cereals.

Many cereals are marketed with a coating, for instance a transparent or frosted sugar coating, for the purpose of improving the flavor and appearance. Although these products are in general satisfactory, they do not provide sufficient variety of flavors, mouth feel, color and appearance, to meet the ever-increasing consumer's demand.

An object of this invention is to provide novel integrated coated edible products, and particularly cereal products, with a totally new flavor and appearance.

Another object is to provide a process for the manufacture of the novel cereal products, which is economical, suitable for large-scale operation, and which may be conducted continuously.

Still another object is to provide a process which may be applied to the coating of all ready-to-eat cereals. The term "ready-to-eat" cereals is intended to include cereals which are puffed or partially puffed such as corn, rice, wheat, whether explosively puffed by the gun method or popped in an ordinary popping machine. It also includes cereals which are flaked, shredded, or extruded before reaching the consumer.

The crux of this invention resides in the finding that it is possible to produce ready-to-eat breakfast cereals, with a real ice cream coating, that is, with a coating of an ice cream product which gives the consumer the characteristic attractive flavor of ice cream. The term "ice cream product" as used herein, refers to freeze-dried ice cream or spray-dried ice cream or any of the conventional ice cream mixes which consist of milk solids, cream, sugar, salt, together with a stabilizer, for instance algin, and usually contain flavoring and coloring agents. Other products obtained by dehydration of ice cream products, for instance, by foam-mat drying, may also be used. It is also possible to use mixtures of these products, for instance freeze-dried ice cream or spray-dried ice cream or a mixture of these two ingredients, with one of the commercially-available powdered ice cream mixes, which are used to make ice cream.

Freeze-dried ice cream, within the scope of this application, is the commercially available product, obtained by drying ice cream under vacuo, in a frozen state, at a temperature of 0° F. or lower. It is available as a powder of about 2% moisture content, of particle size passing through a 16-mesh sieve. Freeze-dried ice cream is available in many flavors, such as vanilla, chocolate, coffee, maple and fruit flavors.

"Spray-dried" ice cream as used herein means the powder obtained by melting conventional ice cream and heating the melt in an atomizer where the material quickly loses water and is deposited as a powder.

Both the freeze-dried ice cream and spray-dried ice cream are hygroscopic materials which have the tendency to become tacky. Although several investigators have attempted to impart a coating of freeze-dried or spray-dried ice cream to various edible products, these efforts, to our knowledge, have been unsuccessful, for several reasons. If the application of the flavoring composition comprising the ice cream product, is made quickly, a substantial amount of the dry composition does not adhere to the article and is wasted. If, however, the application is conducted over a more extended period of time, the composition becomes tacky and neither the flavor nor the appearance are satisfactory.

It has now been found, surprisingly, that a food product of excellent appearance, high palatability and with a novel ice cream flavor is obtained by coating the cereal products with a binder, followed by application, immediately thereafter, of the flavoring composition consisting essentially of the ice cream product, as defined above. More specifically, the invention comprises the steps of preparing small articles of cereal products, coating the surface of the cereal articles with a binder, and immediately thereafter, while the cereal surface is still tacky, applying the flavoring composition.

In the practice of this invention, a ready-to-eat cereal article is prepared by any of the known processes, such as extrusion, puffing or flaking. Then a binder is applied, by spraying or tumbling in a suitable mixing vessel. The coating with the flavoring composition may be achieved by different methods, such as dusting or spraying or tumbling in a revolving apparatus with the coating composition.

A variety of substances may be used as the binder, provided the viscosity is sufficiently low, in the range of 100 to 200,000 centipoises at room temperature, so that a solution of the substance may be conveniently applied onto the cereal articles. More specifically, any of the known natural or synthetic gums, such as gum karaya, gum arabic, tragacanth, carrageenan, carboxymethylcellulose and methyl cellulose may be used. Aqueous solutions of carboxymethylcellulose of molecular weight 200,000, of concentration 0.5%, 1% and 9% and viscosity 200 centipoises, 1050 centipoises and 200,000 centipoises, respectively, at room temperature, may be used as the binder. Mucilaginous plant extracts such as psyllitum seeds, quince seeds, locust bean, are also suitable. It is also possible to use a solution or suspension of starch or dextrins, in the concentration of 1 to 50% of the finished goods.

Also suitable as a binder are the polyhydroxy esters of fatty acids, known in the cereal industry as emulsifying agents, including mono and diglycerides, polysorbitan monostearate, polyoxyethylene stearate, sorbitan monoleate and polyglycerol oleate.

According to the preferred embodiment of this invention, a sugar syrup which improves the flavor of the finished products, is used as the binder. Specifically, the cereal articles, prior to the application of the ice cream product, are coated with a sugar syrup. In this manner, the moisture content increases to 6–7% and the surface of the cereal articles becomes tacky, so that the flavoring composition readily adheres thereto.

The sugar may be sucrose or mixtures of sucrose with other sugars, for instance glucose or lactose or maltose, provided the sugar crystallizes out readily on cooling. A sugar syrup prepared from 80 parts of solid sucrose and 20 parts of water, of viscosity 850 centipoises at 120° F., is advantageously used. Sweetening low-calorie ingredients may also be used, if desired, provided they do not interfere with the crystallization of the coating in the finished product. Invert sugar, if present in substantial amounts, may retard or prevent the sugar from crystallizing out.

The proportion of sugar in the finished goods may be varied over a wide range, and even a small amount, as low as 1% of the finished goods, is sufficient to hold the flavoring composition adhering to the cereal particles. If a sweeter product is desired, the proportion of sugar may be increased up to 50% of the finished goods.

In the actual practice of this invention, a solution is prepared, from 80 parts of sucrose and 20 parts of water. The material is heated to 232° F. to bring about complete dissolution and then cooled to 150°–190° F. A number of factors are important in carrying out the process. Although heating and cooling may be conducted in an open kettle, it is preferable, in order to obtain complete dissolution of the sucrose in a short period of time without causing undue formation of invert syrup, to heat the material rapidly to 240° F. and cool rapidly to 170°–190° F. It has now been found that a very satisfactory product is obtained, if the heating and cooling step are carried out rapidly, in a period of between 1 and 2 minutes, and if the sugar syrup is applied immediately onto the cereal articles, followed by application of the ice cream composition.

It is essential that the flavoring composition be applied quickly, before the binder loses its tackiness. For this purpose, it is advantageous to conduct the application of the flavoring composition in the same operating unit where the sugar coating is carried out and to carry out the two operations continuously. The time required to carry out the coating of the binder and the application of the ice cream composition may vary, but it is preferable to conduct the two operations in a period of 2–3 minutes.

The process will now be described more in detail by reference to the flow sheet, in the drawing. The numeral 1 represents a vessel where the sugar solution in the proportion of 80 parts of sugar to 20 parts of water, is heated to 170° F. The syrup is then delivered by means of a pump P or other suitable means to a heat exchanger, shown at 2a and 2b, where the two-stage process, heating and cooling of the syrup, is conducted. The operating conditions are so adjusted that the temperature of the syrup is raised rapidly to 240° F. in unit 2a and then rapidly chilled to 170°–190° F., in unit 2b, through the two-unit heat transfer apparatus. The process is truly continuous, with efficient mixing being maintained throughout the both stages, and with a total residence time of between 1 and 2 minutes.

In the subsequent step, the sugar syrup is immediately and continuously delivered into a supply tank 3, from which it is introduced at a controlled rate into the coating unit 4. At this stage the sugar syrup is at a temperature of 170°–190° F.

The cereal product, 100 pounds, is introduced into the coating unit at 5. Although a mixing vessel, provided with inner revolving means may be used as the coating unit, it is preferable to use a rotating barrel, provided with suitable means for the introduction of the flavoring composition, so that the latter comes into contact with the cereal particles, already precoated and while the coating is still tacky. More specifically, the flavoring composition comes into contact with the precoated cereal particles in the last third portion of the coating unit, after the sugar syrup and the cereal articles have traveled two-thirds of the coater, and have become thoroughly mixed. This is preferably accomplished by means of a blower 6 located outside of the coating unit, in the proximity of the outlet 7, so that the flavoring composition is brought in contact with the sugar coated cereal particles in the last third portion of the coating unit. The moisture content of the cereal articles, after coating with the sugar syrup and application of the flavoring composition, is 6–7%.

The flavoring composition consists of 10 parts of freeze-dried ice cream and 10 parts of a commercially available powdered ice cream mix per 100 parts of cereal articles. It is advantageous, particularly where substantial moisture is present in the atmosphere, to add to the flavoring composition an anticaking agent, for instance calcium silicate. A small amount of the anticaking agent, between 0.05 and 0.1% of the finished food products, that is about 0.5% of the flavoring composition, is sufficient for this purpose.

The entire operation of coating with the sugar syrup and application of the flavoring composition, is conducted continuously, preferably in a period of 2–3 minutes. After drying for 20 minutes at 200° F. in the drier 8, the moisture content is 2–3%, preferably between 2 and 2.5%.

The finished cereal articles are of excellent taste, attractive color and not tacky. When milk is added, the flavor is characteristic of conventional ice cream. The finished ready-to-eat cereals comprise 66% of cereal product, 20% sugar and 13% of ice cream product, but the proportions may be varied between 15 and 66% of cereal particles, between 1 and 50% of sugar and between 5 and 35% of the flavoring composition. On cooling, the sucrose crystallizes in the form of microcrystals which uniformly cover the entire surface of the cereal articles.

The following examples are set forth below by way of illustration of this invention.

EXAMPLE 1

To 80 pounds of fine granulated sugar are added 20 pounds of water and the mixture is heated up to 170° F. The material is fed, at a rate of 1800 ounces per hour, into the votator, where it is heated to 240° F. and then cooled to 170° F. in the course of one minute.

The syrup so obtained is immediately introduced into one end of a drum coater of 6 feet length and 18 inch diameter. Toasted and flaked rice cereal of 2% moisture content is introduced into the drum coater at the rate of 300 pounds per hour.

The flavoring composition is separately prepared from equal parts of freeze-dried vanilla ice cream and a commercial powdered vanilla ice cream mix, with 0.5% calcium silicate. It is introduced in the dry form into the drum coater by means of a current of air at the rate of 960 ounces per hour so that it comes into contact with the precoated cereals at a point about two-thirds the length of the coater. After the cereal articles reach the end of the coater, coating with the dry flavoring composition is complete and essentially the entire portion of the dry flavoring composition which has been introduced, is used up.

The entire operation of coating with the sugar syrup and application of the flavoring composition, is conducted continuously in a period of 2 minutes. The product emerging from unit 3 has moisture content of 6–7%. After drying for 20 minutes at 200° F., the moisture content is 2.5%.

The finished product is of attractive white color, not tacky, and on addition of milk, the flavor is characteristic of vanilla ice cream.

Substitution of flaked cereals which have not been previously toasted, for the toasted and flaked cereals used above, gives equally satisfactory results.

EXAMPLE 2

The experiment is conducted as above, but the flavoring composition is prepared from equal parts of a commercial powdered vanilla ice cream mix and spray-dried ice cream. For this purpose, commercial vanilla ice cream is allowed to thaw and introduced through a nozzle of the centrifugal atomizer type, into a conventional experimental spray drier, 6 feet high, and about 5 feet diameter, at a temperature of 64°–68° F. Hot air at temperature of 402° F., is introduced into the drier at the rate of 60 cubic feet per minute. The air temperature at the outlet is 168°–204° F. The density of the spray-dried ice cream is 22 pounds per cubic foot.

The finished goods, on addition of milk, develops the characteristic flavor of vanilla ice cream and are undistinguishable from the product of Example 1 above.

From the foregoing description, it will be readily apparent to those skilled in the art that this invention provides a highly improved cereal product with a novel characteristic ice cream flavor. Although this invention has been described in detail with toasted and flaked rice cereals, and with vanilla ice cream, it is manifest that it is readily applicable to other ice cream flavors and other varieties of ready-to-eat cereals.

What is claimed is:

1. The process of producing a ready-to-eat cereal with a real ice cream flavor, which comprises the steps of:
   (a) precoating a precooked cereal with an aqueous solution or suspension of an edible binder, said binder being selected from the group consisting of natural gums, synthetic gums, monoglycerides, diglycerides, starch, dextrins and sugar, and said binder having a viscosity between 100 and 200,000 cps. at room temperature, whereby the surface of said cereal becomes tacky;
   (b) immediately coating said precoated cereal—from step (a) with a dry flavoring composition consisting essentially of an ice cream product, said ice cream product being selected from the group consisting of freeze-dried ice cream, spray-dried ice cream, powdered ice cream mixes, dehydrated ice cream products and mixtures thereof, whereby said composition adheres to said tacky surface of said cereal;
   (c) drying said coated cereal until the moisture content thereof is between 2 and 3 percent, said ready-to-eat cereal further comprising 15 to 66 percent of said cereal particles, up to 50 percent of said binder and 5 to 35 percent of said dry flavoring composition.

2. The process according to claim 1 which is conducted continuously.

3. The process according to claim 1 wherein said binder is applied as a syrup containing between 75 and 80 percent sucrose and between 20 to 25 percent water, and the moisture content after said precoating step is 6 to 7 percent.

4. The process according to claim 3 wherein said binder is applied as a syrup containing 80 percent sucrose and 20 percent water, and wherein said flavoring composition in step (b) contains an anticaking agent in the proportion between 0.05 and 0.1 percent of the finished food product.

5. The process according to claim 3 wherein said sugar syrup, prior to said precoating step, is heated to 240° F. and then cooled to 170° to 190° F., in a heating and cooling zone, with a residence time of 1 to 2 minutes.

6. The process according to claim 5 wherein said precoating and coating steps are continuously conducted in the same coating zone, with a total residence time of 2 to 3 minutes, and said ice cream composition is introduced into said coating zone after the sugar syrup has completely coated said cereal.

References Cited

UNITED STATES PATENTS

| | | | |
|---|---|---|---|
| 1,286,766 | 12/1918 | Post | 99—83 |
| 2,518,247 | 8/1950 | Nairn | 99—81 |
| 3,084,050 | 4/1963 | Holland et al. | 99—92X |
| 3,184,316 | 5/1965 | Doan et al. | 99—83 |

LIONEL M. SHAPIRO, Primary Examiner

J. R. HOFFMAN, Assistant Examiner

U.S. Cl. X.R.

99—1, 83, 126, 134